Patented Jan. 29, 1929.

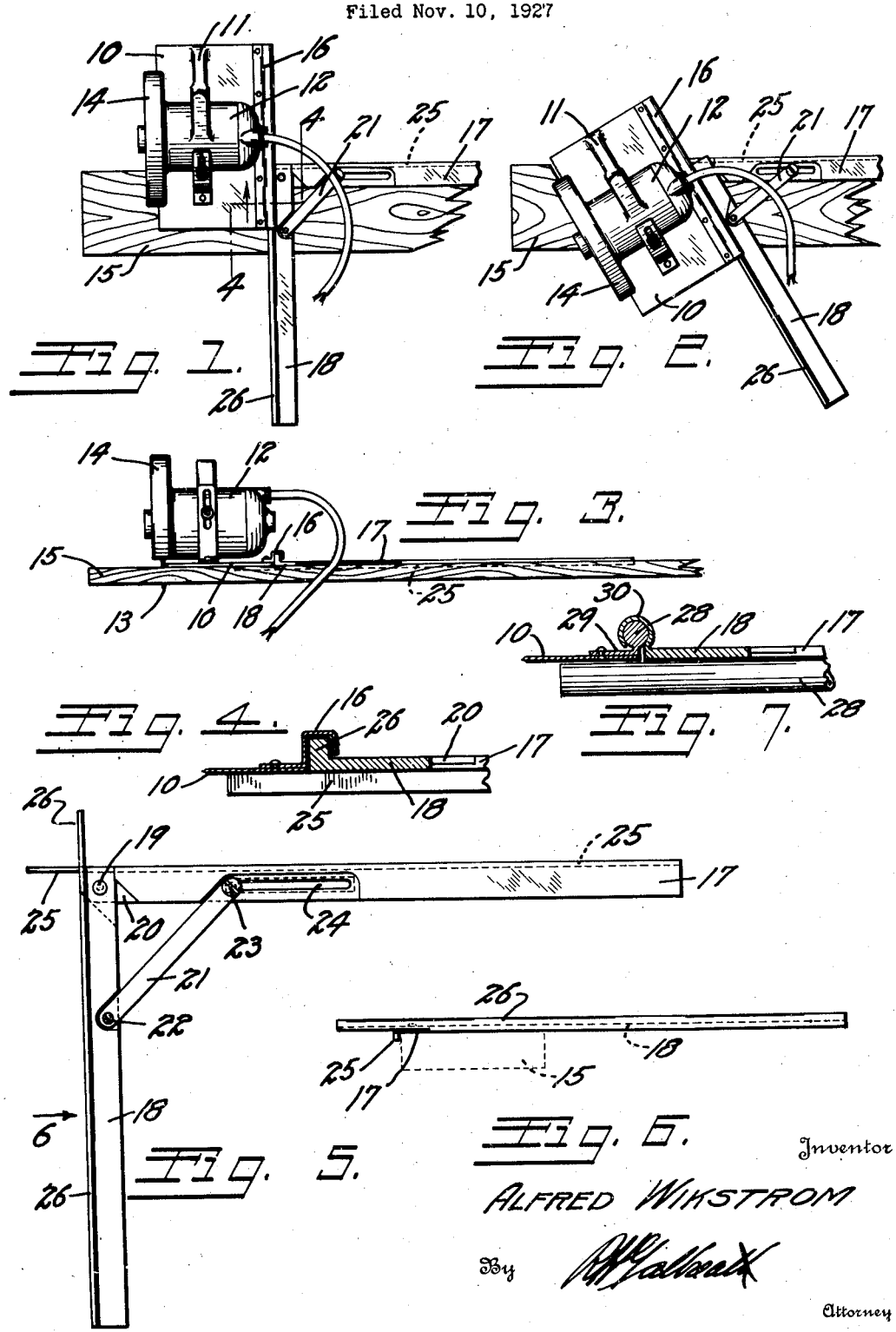

1,700,189

UNITED STATES PATENT OFFICE.

ALFRED WIKSTROM, OF ALBUQUERQUE, NEW MEXICO.

GUIDE FOR WOODWORKING TOOLS.

Application filed November 10, 1927. Serial No. 232,282.

It has been found that it is practically impossible to guide a motor driven hand saw upon a straight course. The saw will constantly tend to follow the path of least resistance and will work away from the line desired. Ordinary squares and straight edges are not successful for guiding the saw because of the fact that the saw will either travel away from the edge of the square or it will gradually clamp so tightly against the square as to lock the saw in the cut.

This invention relates to a guide for woodworking tools more particularly designed for the guiding of a motor driven hand saw. The principal object of the invention is to provide a guide member which will constantly maintain the saw in perfect alignment, so that it will be impossible for the saw to start on an angular cut, thus preventing clamping of the saw in the work.

Another object of the invention is to provide a guide for motor driven hand saws which will not only prevent the saw from approaching the guide but will also prevent its moving away therefrom.

A further object of the invention is to provide a guide square for woodworking tools which will at all times lie flat across the work regardless of which side of the square is in use.

A still further object of the invention is to so construct the base of a motor driven hand saw that it will cooperate with my improved guide to maintain the saw blade in alignment at all times.

Other objects and advantages reside in the detail construction of the invention, which is designed for simplicity, economy, and efficiency. These will become more apparent from the following description.

In the following detailed description of the invention reference is had to the accompanying drawing which forms a part thereof. Like numerals refer to like parts in all views of the drawing and throughout the description.

Fig. 1 is a plan view of the guide directing an electric hand saw through a 90° cross cut.

Fig. 2 is a similar view with the guide arranged to direct a bevel cut.

Fig. 3 is a side view of the guide as shown in Fig. 1.

Fig. 4 is a detail cross section through the base of the saw and the guide taken on the line 4—4, Fig. 1.

Fig. 5 is an enlarged plan view of my improved guide.

Fig. 6 is an end elevation thereof looking in the direction of the arrow 6, Fig. 5.

Fig. 7 is a detail view illustrating a cross section through an alternate form of the guide.

In the drawing one of the usual types of portable motor driven hand saws is illustrated comprising a base shoe 10, handle 11, motor 12, saw 13, and saw guard 14. In Fig. 1 the saw is being used to make a cross cut through a board 15, while in Fig. 2 it is making a miter cut through the board.

To adapt the saw for use with my invention, I attach a grooved guide-engaging member 16 along one edge of the base shoe 10, so that its groove will open downwardly and project beyond the edge of the base shoe.

The guide portion of the invention comprises a relatively long arm member 17 and a relatively short arm member 18. The members 17 and 18 are secured together by means of a pivot pin 19. At the pivot point each of the members is cut away for half its thickness as shown at 20, so it forms a lap joint with flush surfaces. The heads of the pivot pin 19 are countersunk below the surfaces, so that there are no projections at the joint.

The two members 17 and 18 are tied together by means of a tie bar 21 which is inset into, and pivoted to, the member 18 at 22. The other extremity of the tie bar 21 is inset into the member 17 where it may be secured in any desired longitudinal position by means of a clamp bolt 23 arranged to slide in longitudinal slot 24. The tie bar 21, the pivot 22 and the clamp bolt 23 are all set below the surfaces of the members 17 and 18 so that the entire structure, as thus far described, is contained within the surface planes of the members 17 and 18.

Along the outer edge of the member 17 a track bar 25 is carried which projects below the surface of the bar and beyond the pivot pin 19 as shown in Fig. 5. Along the outer edge of the member 18 a similar track bar 26 is carried which also projects beyond the pivot pin 19. The track bar 26, however, projects upwardly from the member 18 so as to be placed upon the opposite face of the entire structure from the bar 25.

As thus far described the guide forms an excellent marking or miter gauge. It has a great advantage over the usual carpenter's flat sheet metal try squares in that the usual square cannot lie flat on the surface of the work when one of the sides lies along one edge of the work. With this improved guide, however, the member 17 can lie on the surface while the track bar 25 engages the edge. This allows the other member 18 to lie flat upon the work for accurate marking purposes.

For unusually wide work the guide may be reversed so that the track member 26 will lie along the edge of the work and the member 17 will lie across it. The tie bar 21 can be quickly adjusted by means of the clamp bolt 23 to cause the two members to form any desired angle with each other.

When using the guide for a motor driven hand saw the guide engaging member 16 is placed with its groove over either the track bar 25 or 26, depending upon which member is extending across the work by means of the handle 11. It is desired to call attention to the fact that the guide engaging member 16 and the track have a relatively long range of contact with each other so that turning or misalignment of the saw is impossible. The base shoe 10 is held rigidly parallel to the guide at all times. By having the tracks extend beyond the pivot pin, the track engaging member can be placed in firm contact with the track before the saw has entered its cut, so that a perfect, clean start is made.

The direction of rotation of saws of this type is such that the edge first entering the work is traveling upwardly so that the natural tendency of the rotation is to pull the base shoe firmly against the work. This tendency is to the advantage of this invention since the track engaging member is at all times held firmly down upon the track.

In Fig. 7 I have illustrated an alternate construction of the invention. In this construction a long, cylindrical bead 28 is secured along one edge of the base shoe 10 by means of brackets 29.

Along the edges of the members 17 and 18 of the guide relatively long sleeves 30 are formed. The sleeves 30 are open along their bottoms so that when they are slid over the bead 28 a passageway will be left for the passage of the brackets 29.

The uses of this form is exactly similar to the uses of the previously described form. The sleeves 30 form projections for aligning and contacting with the edges of the work and also serve to maintain the saw in alignment. With this form, however, the saw cannot be lifted from engagement with guide but must be slid off the ends of the tracks.

While a specific form of the improvement has been described and illustrated herein, it is desired to be understood that the same may be varied, within the scope of the appended claims, without departing from the spirit of the invention.

Having thus described the invention, what I claim and desire secured by Letters Patent, is:—

1. A guide for a woodworking tool comprising two members projecting from each other at an angle; a longitudinal projection arranged along the edge of one of said members and projecting beyond one face of said guide; and a similar longitudinal projection arranged along the edge of the other of said members and projecting beyond the other face of said guide and a channel shaped member arranged to be attached to said tool and arranged to extend over and slide along either of said longitudinal projections.

2. A guide for a woodworking tool comprising: two members hinged to each other so as to swing in a common plane; a longitudinal projection arranged along the edge of one of said members and projecting beyond one face of said guide; and a similar longitudinal projection arranged along the edge of the other of said members and projecting beyond the other face of said guide; and a tool member arranged to be attached to said tool and adapted to slide along and be guided by either of said longitudinal projections.

In testimony whereof I affix my signature.

ALFRED WIKSTROM.